INVENTOR.
FREDERICK L. WILLIAMS
BY
ATTORNEY.

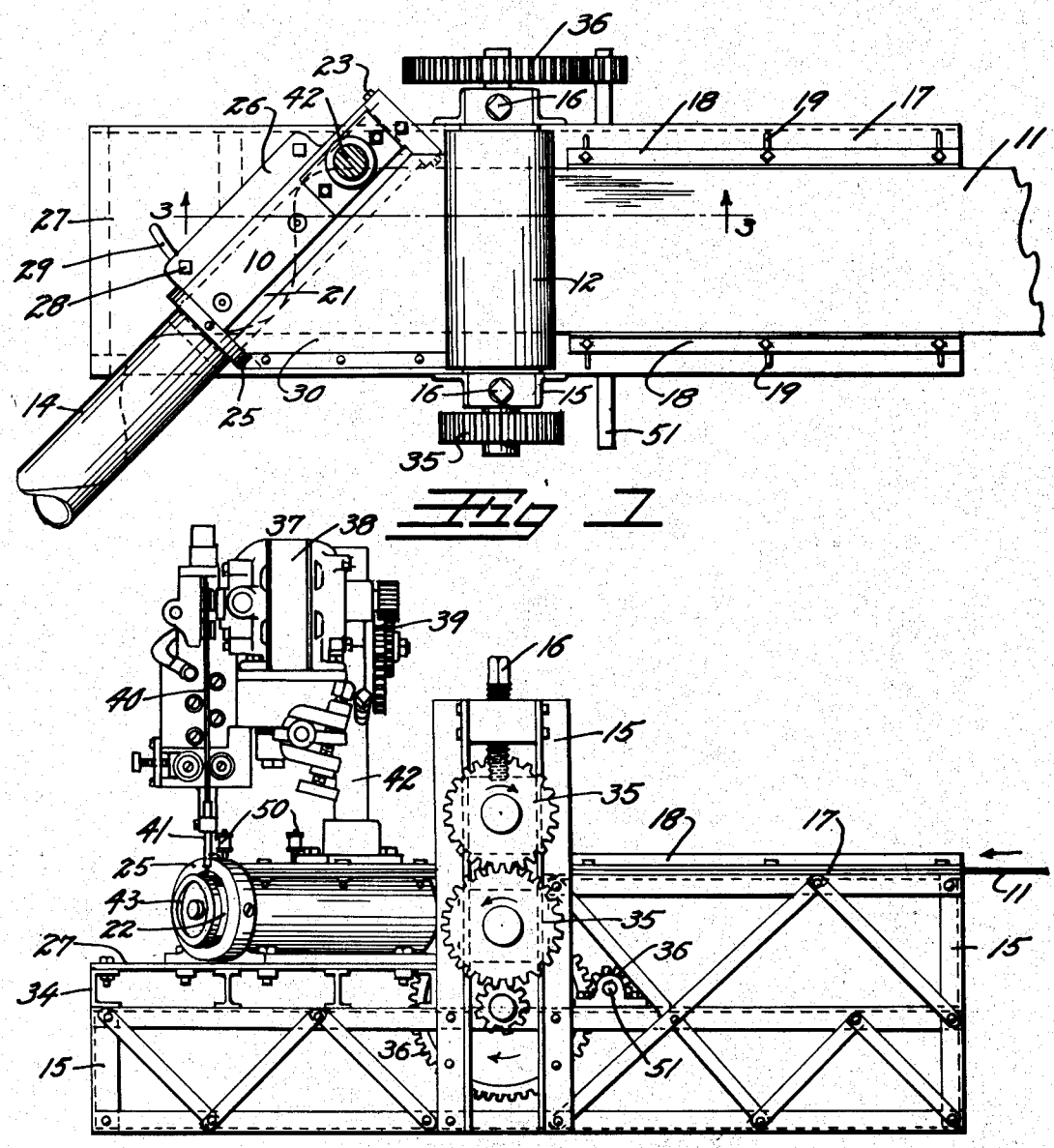

Patented Jan. 6, 1931

1,788,220

UNITED STATES PATENT OFFICE

FREDERICK L. WILLIAMS, OF DENVER, COLORADO, ASSIGNOR TO THE AMERICAN ROLLING MILL COMPANY, OF MIDDLETOWN, OHIO, A CORPORATION OF OHIO

SPIRAL-PIPE MACHINE

Application filed December 13, 1924. Serial No. 755,766.

This invention relates to a device for wrapping a continuous strip of sheet metal in the form of a closed spiral and continuously welding the abutting edges together so as to form a spirally welded sheet metal pipe.

The principal object of the invention is to provide a machine which will accomplish the above in a highly efficient manner and which will have a minimum of working parts.

Another object of the invention is to so arrange the machine that it will be adjustable to accommodate various widths and thicknesses of sheet metal strips.

A further object is to construct a device of this character so that it may be adjusted to produce pipe of various diameters.

Other objects and advantages reside in the detail construction of the invention, which result in simplicity, economy, and efficiency, and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a plan view of the machine with the welding apparatus removed.

Fig. 2 is a side elevation of the machine with the welding apparatus in place.

Figure 3:
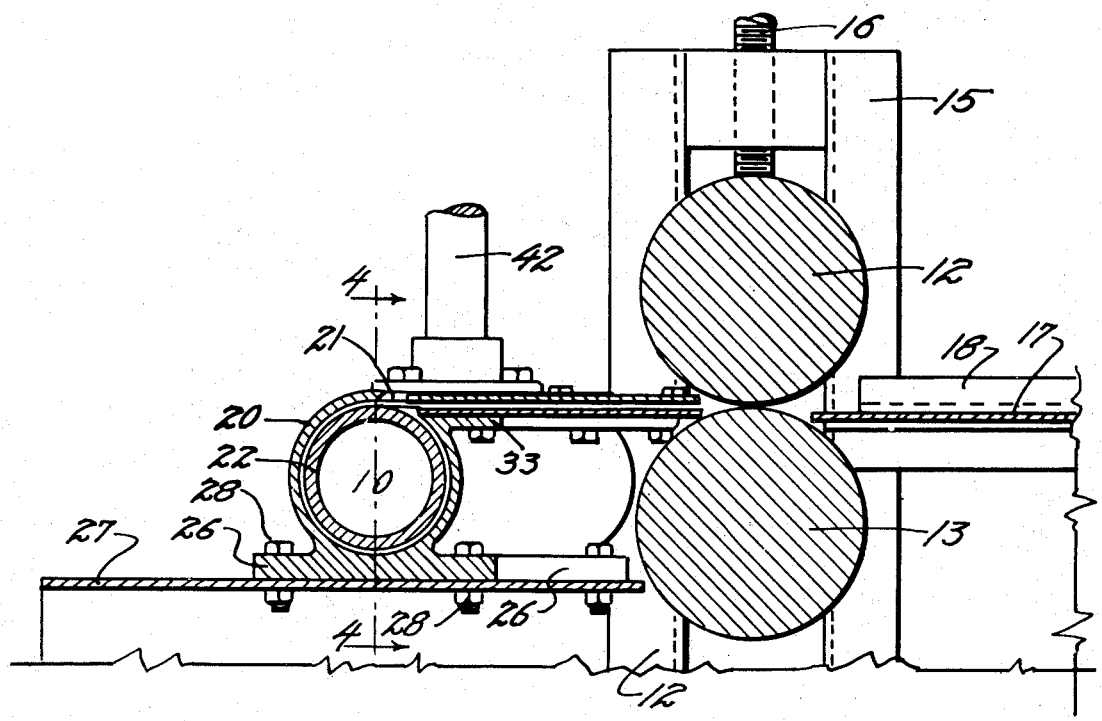
Fig. 3 is a detail cross section on an enlarged scale, taken on the line 3—3, Fig. 1.
Figure 4:
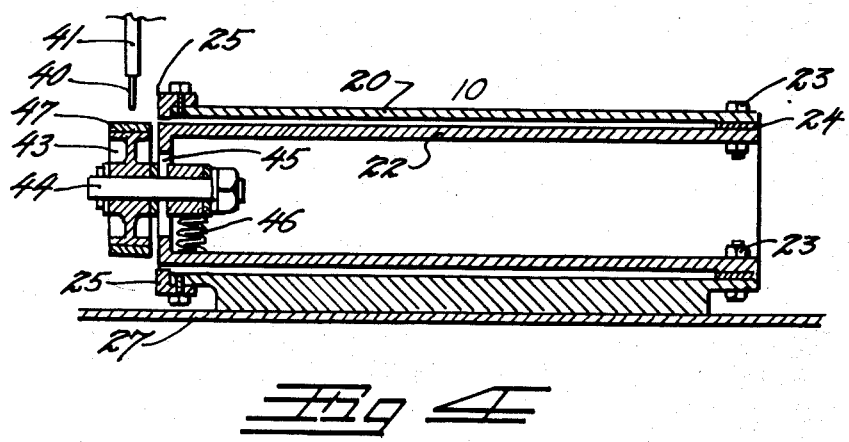
Fig. 4 is a longitudinal section through the former of the machine, taken on the line 4—4, Fig. 3.

The machine comprises an angularly placed former 10 into which a strip of sheet metal 11 is forced by a pair of rolls 12 and 13 and from which the strip emerges in the form of a closed spiral or pipe 14.

The rolls 12 and 13 are held in a suitable frame 15, the upper roll 12 being vertically adjustable therein, so that various gauges of sheet metal may be accommodated between the rolls. Clamp screws 16 are carried in the frame 15 and are used to clamp the upper roll 12 downward against the strip of sheet metal 11 which passes between the two rolls.

Before entering the rolls, the strip 11 passes over a receiving platform 17 upon which guides 18 are arranged to contact with the two edges of the sheet. These guides 18 are very important since they retain the sheet 11 at the proper angle to enter the former 10 and any play or movement here results in an open seam on the spiral. The guides 18 are secured to the receiving platform in slotted openings 19 so that their spaced-apart distance may be varied to suit various widths of sheets. Any other adjustable spacing means would, however, be within the spirit of the invention.

The former 10 comprises an outer cylinder 20, provided with an opening 21 for the entrance of the strip 11, and an inner spaced-apart cylinder 22. The two cylinders are secured together at their one extremity by a suitable bolt 23 and a spacer ring 24. The space between the cylinders 20 and 22 is such as to allow free passage of the strip 11. The inner cylinder serves simply to prevent wrinkling or buckling of the sheet.

Carried at the free end of the outer cylinder 20 is a former ring 25. The former is cast of cast iron or similar material and the outer cylinder will wear to a larger diameter from the constant friction. The former ring 25 is made to the exact diameter of the pipe desired and is made of tool steel or other hard material so that it will resist wear. It can be easily replaced, however, when sufficient wear occurs. The former ring serves to contract the spiral to the exact diameter as it emerges from the former.

Lugs 26 are cast on the outer cylinder for bolting the former 10 to a former platform 27 carried by the frame 15. Bolts 28 are passed through the lugs 26 into slotted openings 29 in the former platform 27. These openings 29 allow the angle of the former to be adjusted to suit various diameters of pipe and widths of sheet.

Figure 5:
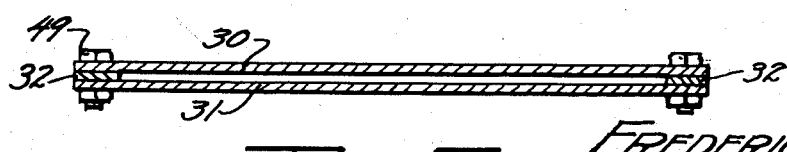
Fig. 5 is a detail cross section through what will be hereinafter designated the buckle plates.

To prevent buckling of the strip 11 between the rolls and the former, spaced-apart buckle plates 30 and 31, illustrated in Fig. 5, are employed. The plates 30 and 31 are held spaced a distance substantially equal to the gauge of the strip 11 by suitable spacers 32. The buckle plates are supported at their one extremity on the frame 15 and at their other extremity on the lug 33 on the former 10.

Should it be desired to roll pipe of different diameter, a former of a different diameter is substituted for the former 10. The former platform 27 is carried on suitable supporting bars 34. These are replaced by bars of a suitable height to suit the newly installed former so that the receiving slot 21 of the former will be brought into alignment with strip 11.

The rolls 12 and 13 carry similar spur gears 35 which are driven through suitable speed reduction gears 36 from any desired power source.

Mounted above the former 10 is an automatic arc welding machine, designated in its entirety by the numeral 37. The welding machine per se forms no part of the present invention and may be one of the many automatic arc welding heads which are at present on the market. Briefly, the welding machine 37 comprises a motor 38 which is arranged, through a train of gears 39, to feed a wire of welding metal 40 through a tube 41 to the work. An electric arc is formed between the welding metal and the work which fuses the welding metal and the work into a homogeneous whole.

The current feeding to the arc controls the speed of the motor 38 so that the arc will be automatically adjusted and should it become extinguished the motor will contact the welding metal and work so as to remake the arc.

The welding machine 37 is carried on a standard 42 or in any other suitable manner so that the arc will form directly over the contacting edges of the spiral as they emerge from the former ring 25.

To prevent the arc from burning through the metal of the pipe and to retain a smooth interior an internal wheel 43 is carried on the extremity of the inner cylinder 22 of the former 10. The wheel 43 is carried on an axle 44 which travels in a slot 45 in the end of cylinder 22. A spring 46 is arranged to constantly press the axle 44 upward and hold the wheel 43 firmly and constantly against the interior of the pipe. The wheel 43 may be made entirely of copper or be provided with a copper tread 47 so as to radiate the heat quickly away from the point opposite the weld. The wheel 43 is arranged so as to contact with interior of pipe directly under the welding wire 40. The axis of the wheel 43 is parallel to the axis of the former. This causes the pipe seam to travel across the wheel at an angle which removes the tendency of arc to wear a groove in the wheel. The wheel 43 is of a smaller diameter than the interior of the pipe 14 and does not contact with the lower inside face.

Oil cups 50 are provided on the external cylinder 20 of the former 10 to supply lubricant to the strip 11 as it passes through the former.

The drive shaft of the machine is shown at 51. This may be attached to a suitable electric motor for driving the machine. This motor should be so connected that the arc current will control the motor current so that if the arc breaks the entire mechanism will come to rest so as to prevent a gap in the welded seam. Such a connection is of common practice in present automatic welding machines and need not be described in detail here.

While a specific form of the improvement has been described and illustrated herein, it is desired and understood that the same may be varied, within the scope of the appended claims, without departing from the spirit of the invention.

Having thus described the invention, what I claim and desire to secure by Letters Patent is:

1. A machine for rolling a metal strip into a closed spiral comprising: an open ended cylinder, said cylinder being provided with a tangently arranged opening to receive said strip; rolls arranged to force said strip into said opening at an angle to the axis of said cylinder so that it will emerge from said open end in a spiral; and means arranged to force said spiral inwardly from said cylinder so as to contract said spiral to the desired diameter as it emerges.

2. A machine for rolling a metal strip into a closed spiral comprising: an open ended cylinder; said cylinder being provided with a tangently arranged opening to receive said strip; rolls arranged to force said strip into said opening at an angle to the axis of said cylinder so that it will emerge from said open end in a spiral; and means arranged to force said spiral inwardly from said cylinder so as to contract said spiral to the desired diameter as it emerges, said latter means comprising: a former ring adapted to surround and extend inwardly from said open end.

3. A machine for rolling a metal strip into a closed spiral comprising: an open ended cylinder; said cylinder being provided with a tangently arranged opening to receive said strip; rolls arranged to force said strip into said opening at an angle to the axis of said cylinder so that it will emerge from said open end in a spiral; means arranged to force said spiral inwardly from said cylinder so as to contract said spiral to the desired diameter as it emerges, said latter means comprising: a former ring adapted to surround and extend inwardly from said open end; and means for supporting an electric arc over the edges of said tube after they pass said contracting means.

4. In a machine for forming a closed spiral of a strip of sheet metal and having rolls arranged to force said strip into the interior of an open ended cylinder so that it will emerge from said open end in a closed spiral, means for supporting said cylinder in adjustable relation to said rolls comprising a base formed on said cylinder; a supporting surface in fixed relation to said rolls; and means for securing said base to said supporting surface so that its position thereon can be varied and set as desired.

In testimony whereof, I affix my signature.

FREDERICK L. WILLIAMS.